(12) United States Patent
Reszewicz et al.

(10) Patent No.: US 10,578,224 B2
(45) Date of Patent: Mar. 3, 2020

(54) CHECK VALVES

(71) Applicant: Hamilton Sundstrand Corporation, Charlotte, NC (US)

(72) Inventors: Modest Reszewicz, Wroclaw (PL); Pawel Czarnecki, Swidnica (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/622,252

(22) Filed: Jun. 14, 2017

(65) Prior Publication Data

US 2017/0356561 A1 Dec. 14, 2017

(30) Foreign Application Priority Data

Jun. 14, 2016 (EP) .................................... 16461526

(51) Int. Cl.
*F16K 27/02* (2006.01)
*F16K 15/03* (2006.01)
*F16K 47/02* (2006.01)

(52) U.S. Cl.
CPC ........ *F16K 27/0209* (2013.01); *F16K 15/038* (2013.01); *F16K 47/023* (2013.01)

(58) Field of Classification Search
CPC .... F16K 15/038; F16K 15/03; F16K 27/0209; Y10T 137/7839; Y10T 137/7898; F24F 13/1486; F24F 13/14; F24F 13/18
See application file for complete search history.

(56) References Cited

U.S. PATENT DOCUMENTS

| 1,673,831 | A | * | 6/1928 | Kuehne | ................ F16K 15/035 |
| | | | | | 137/512 |
| 1,708,907 | A | | 4/1929 | Spencer | |
| 4,196,745 | A | | 4/1980 | Schutzer | |
| 5,301,709 | A | | 4/1994 | Gasaway | |
| 5,819,790 | A | * | 10/1998 | Cooper | ................ F16K 15/038 |
| | | | | | 137/512.1 |
| 2009/0235916 | A1 | | 9/2009 | Rossetti | |
| 2012/0180880 | A1 | | 7/2012 | Pettit et al. | |
| 2015/0298225 | A1 | * | 10/2015 | Ueno | ....................... B23C 3/00 |
| | | | | | 244/129.1 |
| 2015/0362080 | A1 | * | 12/2015 | Vu | ............................ F16K 1/42 |
| | | | | | 137/1 |

OTHER PUBLICATIONS

Extended European Search Report for International Application No. 16461526.2 dated Dec. 14, 2016, 7 pages.

* cited by examiner

*Primary Examiner* — Mary E McManmon
*Assistant Examiner* — Nicole Gardner
(74) *Attorney, Agent, or Firm* — Cantor Colburn LLP

(57) ABSTRACT

A valve housing for a check valve comprises a housing body for mounting a pair of flapper elements and a pair of valve openings extending through said valve body. The valve openings are separated by a web which extends from one side of the valve body to an opposed side of the valve body. The valve body and web define sealing surfaces around the valve openings on one face of the valve housing. The web comprises a slot extending into the web from a face thereof on said one face of said valve housing and extending along a length of the web.

14 Claims, 5 Drawing Sheets

CHECK VALVES

FOREIGN PRIORITY

This application claims priority to European Patent Application No. 16461526.2 filed Jun. 14, 2016, the entire contents of which is incorporated herein by reference.

TECHNICAL FIELD

The present disclosure relates to check valves, and in particular to valve housings for check valves.

BACKGROUND

It is known to use check valves to allow fluid flow in one direction, and to prevent flow in the opposite direction. Check valves are widely used in a wide variety of applications, for example in air conditioning systems, more particularly in aircraft air conditioning systems.

Many types of check valves are known. Some check valves include hinged flappers that open in the direction of fluid flow. In such valves, when a fluid pressure exceeds a predetermined valve "cracking pressure", the flappers of the valve open to allow flow through the valve. Likewise, if significant pressure drops in the upstream fluid are experienced (such that there is a negative pressure differential across the valve), the flapper elements close, preventing flow reversal.

Such valves typically include a valve housing which comprises a pair of valve openings, each sealed by a respective flapper element, and separated by a web. This web has to withstand forces induced by the pressure exerted on the valve.

It may be desirable to minimise the mass of components, particularly those intended for use in aircraft. To this end, it is desirable to design components to use as little material as possible while meeting structural demands.

SUMMARY

According to one embodiment of the present disclosure, there is provided a valve housing for a check valve, the valve housing comprising a housing body for mounting a pair of flapper elements and a pair of valve openings extending through the valve body. The valve openings are separated by a web which extends from one side of the valve body to an opposed side of the valve body. The valve body and the web define sealing surfaces around the valve openings on one face of the valve housing. The web comprises a slot extending into the web from a face thereof on the one face of the valve housing and extending along a length of the web.

The slot may have a maximum depth that is greater than 15% of the depth of the web.

The slot may have a maximum width that is greater than 15% of the width of the web.

The slot may extend along substantially the entire length of the web.

The slot may be generally T-shaped in cross section.

The generally T-shaped cross section may comprise a narrower portion adjacent the one face of the web and a wider portion spaced from the narrower portion.

The slot may have a rounded base, a flat base, or a flat base with rounded corners.

According to another embodiment of the present disclosure, there is provided a check valve comprising a valve housing in accordance with the disclosure, and a pair of flapper elements pivotally mounted to the valve housing for closing the valve openings.

According to another embodiment of the present disclosure, there is provided a method of manufacturing the valve housing in accordance with the disclosure. The method comprises the step of providing a housing body having a pair of valve openings extending therethrough and separated by a web which extends from one side of the valve body to an opposed side of the valve body. The valve body and the web define sealing surfaces around the valve openings on one face of the valve housing. The step further comprises forming a slot extending into the web from a face thereof on the one face of the valve housing.

The step of forming the slot may comprise milling the slot into the web.

The milling step may be performed using a milling tool having a generally T-shaped cutting head.

In a further embodiment, the step of forming the slot may comprise casting the valve housing with the slot in the web.

In a further embodiment, the step of forming the slot may comprise additively manufacturing the valve housing with the slot in the web.

According to another embodiment of the present disclosure, there is provided a method of repairing a check valve comprising a valve housing a housing body for mounting a pair of flapper elements. The housing comprises a pair of valve openings extending through said valve body, the valve openings being separated by a web which extends from one side of the valve body to an opposed side of the valve body. The valve body and the web define sealing surfaces around the valve openings on one face of the valve housing. A pair of flapper elements are pivotally mounted to the valve housing for closing the valve openings. The method comprises the step of removing the flapper elements from the valve housing and re-fitting the flapper elements to a valve housing according to the present disclosure.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
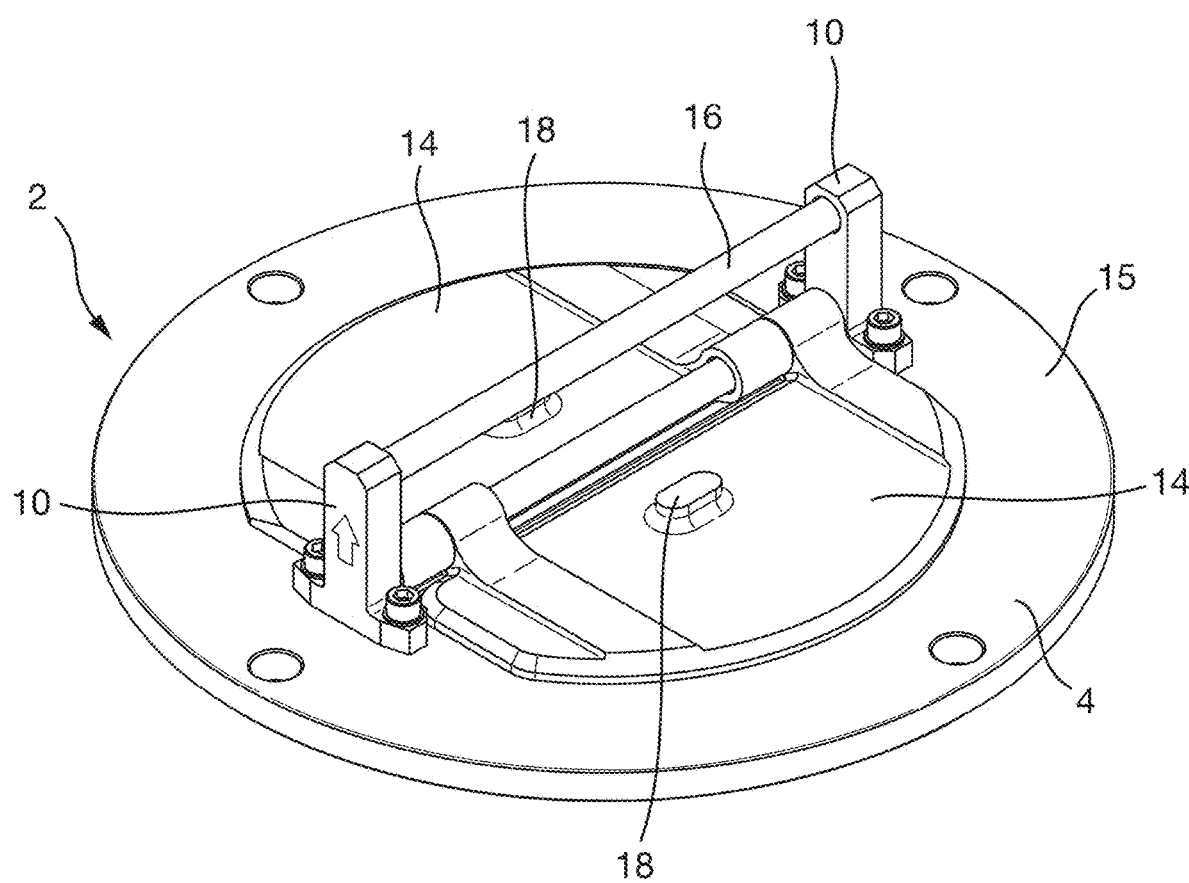
FIG. 1 shows an isometric view of a check valve in accordance with this disclosure.
Figure 2:
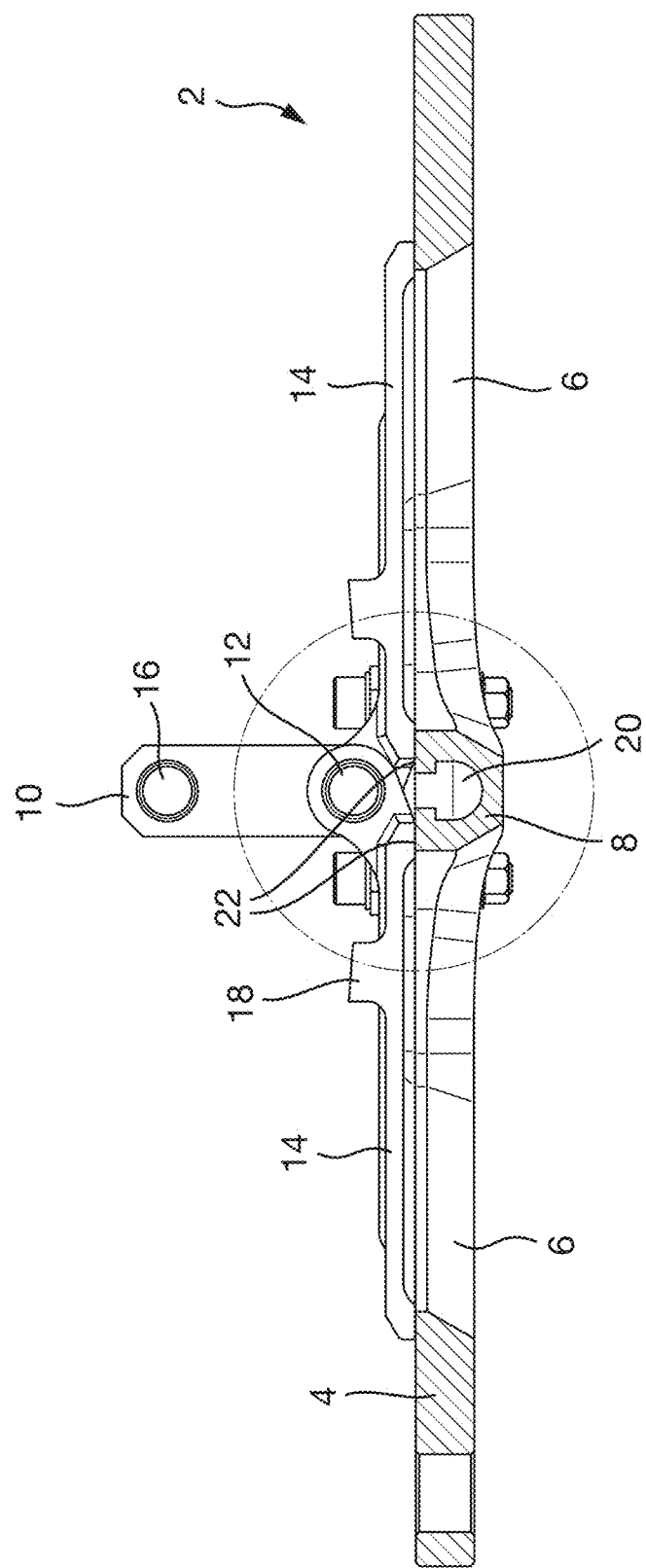
FIG. 2 shows a cross-sectional view of the check valve of FIG. 1.

With reference to FIGS. 1 and 2, a flapper check valve 2 is illustrated. The check valve 2 is configured to be mounted around its periphery in or to, for example, a duct in order to prevent reverse flow of a fluid through the duct.

The check valve 2 comprises a valve housing 4, in this embodiment formed as a generally planar annular element. The valve housing 4 comprises a pair of valve openings 6 which extend through the body of the valve housing 4 and are separated by a central web 8.

A pair of mounting posts 10 are arranged on opposed sides of the valve housing 4 and extend upwardly from the valve housing 4. A hinge pin 12 is mounted between the mounting posts 10 above the central web 8 of the valve housing 4. The valve openings 6 are closed by a pair of generally planar D-shaped flapper elements 14 which are pivotally mounted to the hinge pin 12. The flapper elements 14 form a seal with surfaces of the body of the valve housing 4 and the web 8 on one face 15 of the valve housing 4.

The mounting posts 10 may be integrally formed, for example cast, with the valve housing 4. Alternatively, the mounting posts 10 may be separately formed from the valve housing 4 and mounted thereto by suitable means, for example by welding, brazing or by suitable fastening means.

In the illustrated embodiment, a stop pin 16 extends between the mounting posts above the hinge pin 14. Bumper elements 18 are arranged opposite one another on the respective flapper elements 14 so as to engage the stop pin 16 when the flapper elements 14 are in the open position. Alternative forms of stops may be provided.

As discussed so far, the construction of the check valve 2 is conventional.

As will now be described with further reference to FIG. 2 and with reference to FIG. 3, a check valve of this disclosure further comprises a slot 20 formed in the web 8 through a face 22 thereof on the sealing-side face 15 of the valve housing 4. The slot 20 extends along the entire length of the web 8 directly below the hinge pin 12.

Figure 3:
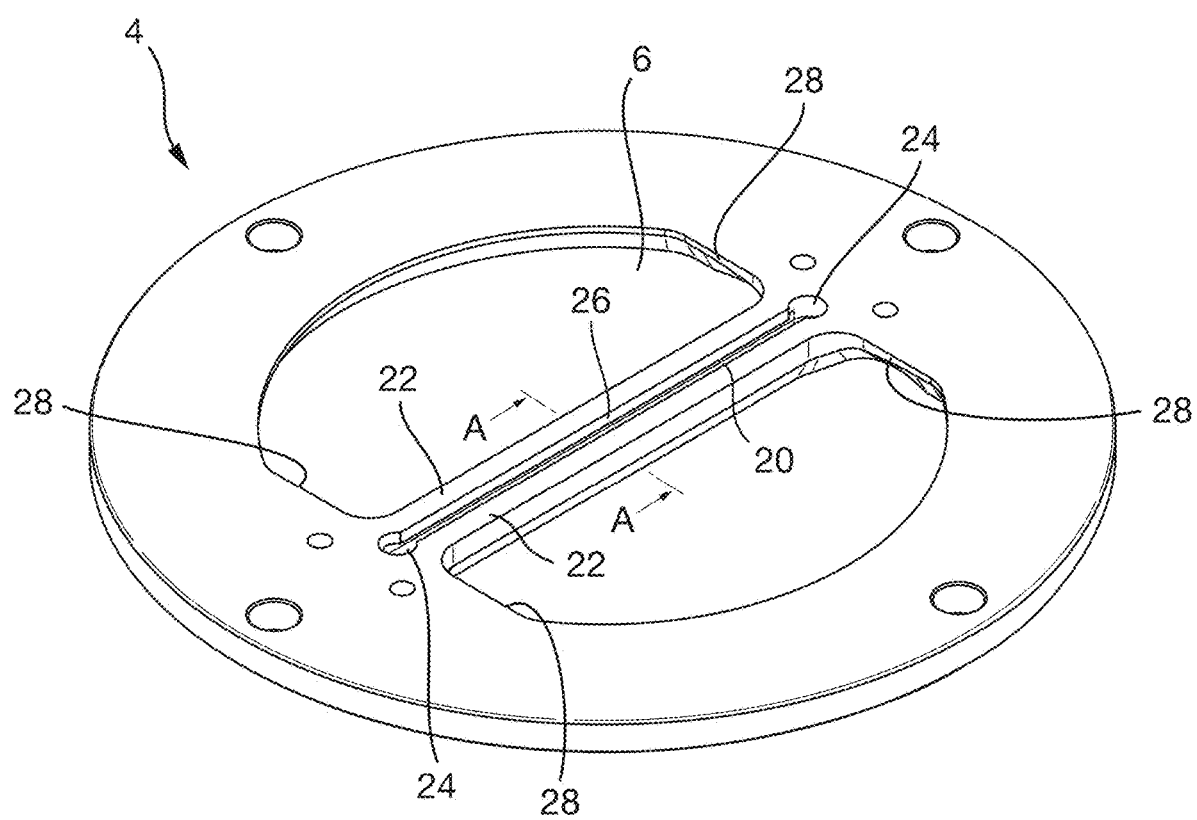
FIG. 3 shows a valve housing for a check valve in accordance with this disclosure.

FIG. 3 shows, in isolation, an embodiment of a valve housing 4 for a check valve 2. The slot 20 comprises a medial portion 26 extending between two opposed end portions 24. In the illustrated non-limiting example, the slot 20 extends along the web 8 from one end portion 24, located at or beyond an edge 28 of an opening 6, to an opposed end portion 24, located at or beyond an opposed edge 28 of the opening 6. It may be beneficial to the structural performance of the web 8 for the larger-diameter end portions to be formed in the more robust area of the valve housing 4 that lies beyond the edges 28 of the openings 6. Alternatively, the slot 20 may only extend to and from locations which lie between the edges 28.

Figure 4A:
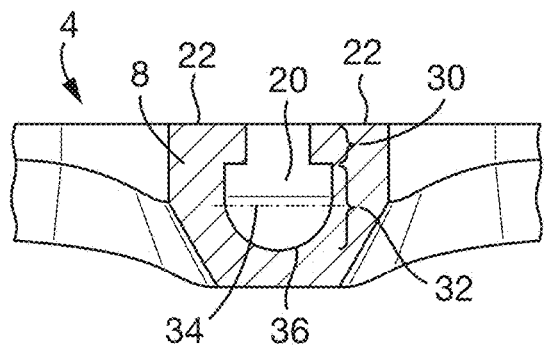
FIGS. 4A-4E show example embodiments of cross-sections of valve housings in accordance with this disclosure.

FIG. 4A shows a vertical cross-sectional view of the of valve housing 4 of FIG. 3 taken along line A-A of FIG. 3. In this embodiment, the cross-sectional shape of slot 20 is substantially T-shaped. The slot 20 comprises a narrower portion 30 adjacent the face 22 of the web 8 and a wider portion 32 adjacent the narrower portion 30. The web 8 further comprises a neutral axis 34. In this example, the wider portion 32 of the slot 20 is arranged at the neutral axis 34. Removing material from adjacent the neutral axis 34 results in a desirable decrease in mass of the web while minimising the effect on the section modulus of the web 8. The illustrated example cross-section further comprises a rounded base 36 in order to reduce stress concentrations in the web 8.

The slot shape described above is merely exemplary, and the slot may have any shape. Some further exemplary slot shapes are illustrated in FIGS. 4B to 4E.

In some embodiments, the cross-sectional shape of the slot 20 is sized so as to remove as much material as possible without compromising the structural properties of the web 8. In some exemplary embodiments, the slot 20 has a maximum cross-sectional depth that is greater than 15% of the depth of the web 8. In other examples, the depth of the slot 20 is greater than 25%, greater than 50%, or greater than 75% of the web 8 depth. In some embodiments, the maximum cross-sectional width of the slot 20 may be greater than 15% of the width of the web 8. In other examples, the width of the slot 20 is greater than 25%, greater than 50%, or greater than 75% of the web width.

Figure 4B:
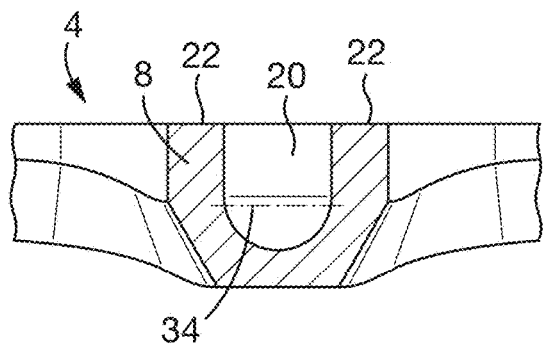

FIG. 4B shows a cross-sectional view of another embodiment of valve housing 4. The cross-sectional shape of slot 20 is generally straight, and comprises a single-width portion ending in a rounded base 36.

Figure 4C:
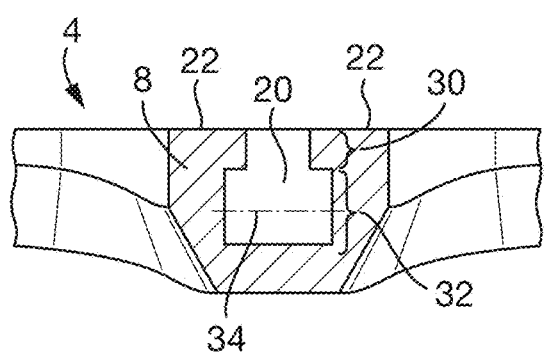

FIG. 4C shows a cross-sectional view of another embodiment of valve housing 4. The cross section of slot 20 comprises a generally T-shaped as in the example of FIG. 4A, differing in that the slot 20 comprises a flat base.

Figure 4D:
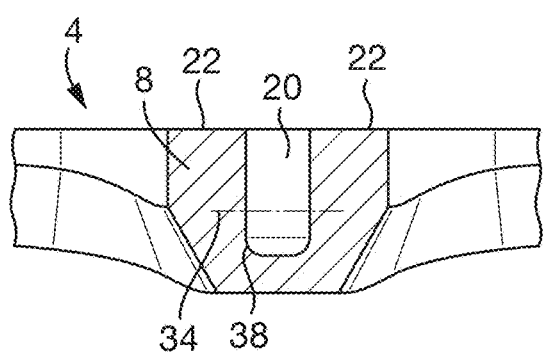

FIG. 4D shows a cross-sectional view of another embodiment of valve housing 4. The cross-sectional shape of slot 20 is generally straight as in the example of FIG. 4B, but comprises a flat base with rounded corners 38.

Figure 4E:
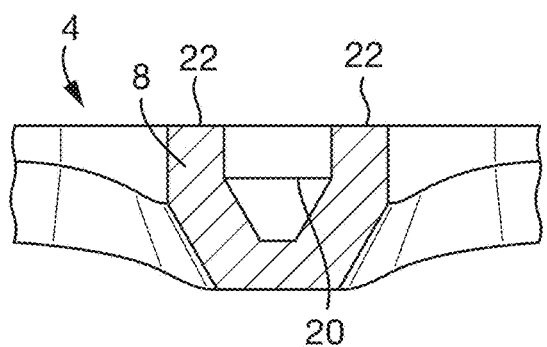

FIG. 4E shows a cross-sectional view of another embodiment of valve housing 4. The cross-sectional shape of slot 20 is generally V-shaped, narrowing towards a flat end of the slot 20.

Referring again to FIG. 3, in one example the end regions 24 and the medial region 26 may have different cross-sectional shapes. In this illustrated example, the medial portion 26 comprises a generally T-shaped cross-section similar to that illustrated in FIG. 4A, while the end regions 24 comprise a generally straight cross-section similar to that illustrated in FIG. 4B. The narrower portion 30 of the end regions 24 is enlarged relative to the narrower portion 30 of the medial region 26. Alternatively, the slot 20 may have the same cross-sectional shape throughout, with no distinct end portions or medial portion.

Figure 5A:
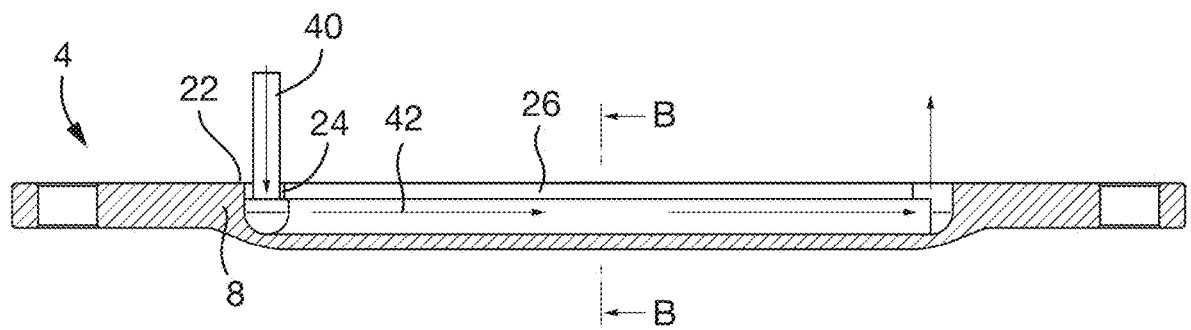
FIGS. 5A-5C show a steps in an exemplary method for forming a slot in a valve housing in accordance with this disclosure.
Figure 5B:
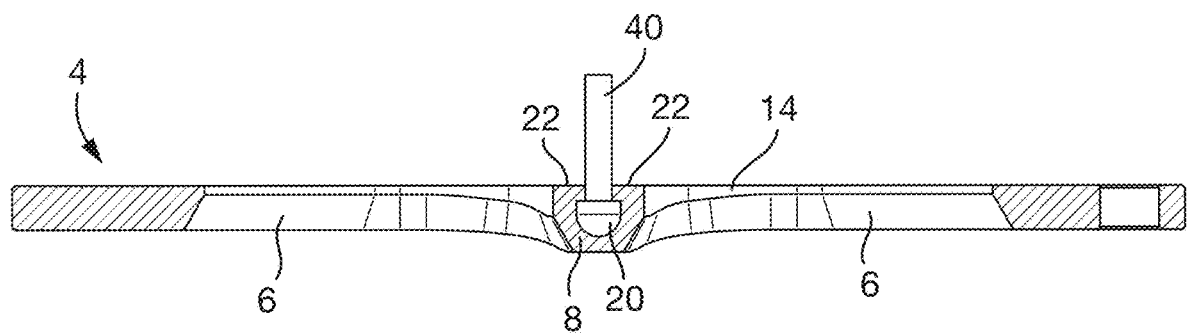
Figure 5C:
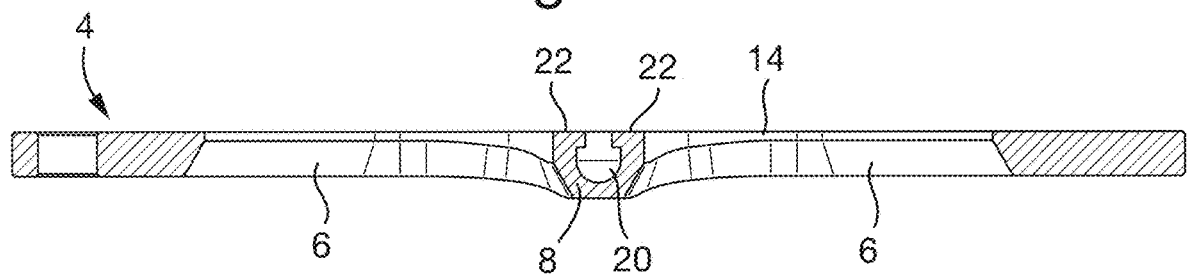

FIGS. 5A to 5C show steps of an example method of forming slot 20 in valve housing 4. The exemplary method comprises milling the slot 20 with a milling tool 40. FIG. 5A shows a side view of the valve housing 4 with milling tool 40. As shown, the milling tool 40 is first inserted into the web 8 through face 22 to form a first end region 24 of the slot 20. The milling tool is then moved along the web 8, following path 42, to form the medial portion 26 of the slot. The milling tool 40 is finally withdrawn from web 8 at the end of path 42 to form an opposing end portion 24. FIG. 5B shows a view of the valve housing 4 taken along line B-B during the milling step. FIG. 5C shows a view of the valve housing 4 taken along line B-B after the step of milling slot 20.

The slot 20 may alternatively be formed by other processes, including, but not limited to, casting or additive manufacturing of the valve housing 4.

The valve housing 4 may be manufactured as part of a new check valve 2. Alternatively, the valve housing 4 may be fitted with other parts from an existing check valve to form a new check valve 2. Thus the valve housing 4 may be used to refurbish or repair an existing check valve by replacing the valve housing of that check valve with a valve housing in accordance with the disclosure.

Each of the illustrated embodiments has the advantage of minimising the mass of valve housing 4 through the removal of material from the web 8 in the region of its neutral axis 34, while maintaining the structural integrity of the web 8 and the seal between web 8 and flapper elements 14.

Although the figures and the accompanying description describe particular embodiments and examples, it is to be understood that the scope of this disclosure is not to be limited to such specific embodiments, and is, instead, to be determined by the following claims.

The invention claimed is:

1. A valve housing for a check valve, said valve housing comprising:
   a housing body for mounting a pair of flapper elements;
   a pair of valve openings extending through said housing body, said valve openings being separated by a web which extends from one side of the housing body to an opposed side of the housing body;
   said housing body and said web defining sealing surfaces around the valve openings on one face of the valve housing;
   wherein the web comprises a slot extending into the web from a face thereof on said one face of said valve housing and extending along a length of the web;
   wherein the slot extends along substantially the entire length of the web.

2. The valve housing of claim 1, wherein the slot has a maximum depth that is greater than 15% of the depth of the web.

3. The valve housing of claim 1, wherein the slot has a maximum width that is greater than 15% of the width of the web.

4. The valve housing of claim 1, wherein the slot is generally T-shaped in cross section.

5. The valve housing of claim 4, wherein the generally T-shaped cross section comprises a narrower portion adjacent the face of the web and a wider portion spaced from the narrower portion.

6. The valve housing of claim 1, wherein said slot has a rounded base, a flat base, or a flat base with rounded corners.

7. The valve housing of claim 1, wherein said slot is generally V-shaped, and narrows towards a base.

8. The valve housing of claim 1, further comprising:
   the pair of flapper elements, wherein the pair of flapper elements are pivotally mounted to the valve housing for closing the valve openings to form a check valve.

9. A method of manufacturing the valve housing of claim 1, the method comprising:
   providing the housing body having the pair of valve openings extending therethrough and separated by the web which extends from one side of the housing body to the opposed side of the housing body, said web defining sealing surfaces around the valve openings on the one face of the valve housing; and
   forming the slot extending into the web from the face thereof on said one face of said valve housing.

10. The method of claim 9, wherein the step of forming the slot comprises milling the slot into the web.

11. The method of claim 10, wherein said milling is performed using a milling tool having a generally T-shaped cutting head.

12. The method of claim 9, wherein the step of forming the slot comprises casting the valve housing with the slot in the web.

13. The method of claim 9, wherein the step of forming the slot comprises additively manufacturing the valve housing with the slot in the web.

14. A method of repairing a check valve comprising a first valve housing and a pair of flapper elements;
   the method comprising:
   removing the flapper elements from the first valve housing and re-fitting the flapper elements to the valve housing of claim 1.

* * * * *